US012631931B2

(12) United States Patent
Cai

(10) Patent No.: US 12,631,931 B2
(45) Date of Patent: May 19, 2026

(54) ELECTRONIC INK DISPLAY PANEL, MANUFACTURING METHOD THEREFOR, AND ELECTRONIC DEVICE

(71) Applicant: Honor Device Co., Ltd., Shenzhen (CN)

(72) Inventor: Peizhi Cai, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 378 days.

(21) Appl. No.: 18/273,893

(22) PCT Filed: Sep. 2, 2022

(86) PCT No.: PCT/CN2022/116714
§ 371 (c)(1),
(2) Date: Jul. 24, 2023

(87) PCT Pub. No.: WO2023/036056
PCT Pub. Date: Mar. 16, 2023

(65) Prior Publication Data
US 2024/0427213 A1      Dec. 26, 2024

(30) Foreign Application Priority Data
Sep. 8, 2021    (CN) .......................... 202111047546.9

(51) Int. Cl.
*G02F 1/167*          (2019.01)
*G02F 1/1675*        (2019.01)
(52) U.S. Cl.
CPC ............ *G02F 1/1675* (2019.01); *G02F 1/167* (2013.01)

(58) Field of Classification Search
CPC ............................ G02F 1/167; G02F 1/16757
See application file for complete search history.

(56) References Cited

U.S. PATENT DOCUMENTS

| | | | |
|---|---|---|---|
| 7,319,554 B1 * | 1/2008 | Abe ........................ | G02F 1/167 |
| | | | 359/290 |
| 2005/0179984 A1 | 8/2005 | Liang et al. | |
| 2011/0133627 A1 * | 6/2011 | Yi ........................... | G02F 1/167 |
| | | | 445/24 |
| 2012/0032992 A1 | 2/2012 | Lim et al. | |

(Continued)

FOREIGN PATENT DOCUMENTS

| | | | | |
|---|---|---|---|---|
| CN | 100520553 C | * | 7/2009 | ............. G02F 1/167 |
| CN | 103576403 A | | 2/2014 | |

(Continued)

*Primary Examiner* — Yuzhen Shen
(74) *Attorney, Agent, or Firm* — Slater Matsil, LLP

(57) ABSTRACT

An-electronic ink display panel includes an electronic ink base layer. The electronic ink base layer-includes a plurality of pixel wells, and a depth of each first pixel well is less than a depth of each second pixel well; a first color portion is disposed in each pixel well in a plurality of first pixel wells and a plurality of second pixel wells, the first color portion includes first ink and a first packaging layer, the first packaging layer is located on a side that is of the first ink and that is away from a bottom of the pixel well, and in each first pixel well, the first color portion fills the first pixel well; a second color portion is further disposed in each pixel well in the plurality of second pixel wells, the second color portion includes second ink and a second packaging layer.

20 Claims, 11 Drawing Sheets

(56)     References Cited

U.S. PATENT DOCUMENTS

2015/0277204 A1     10/2015  Qu
2023/0168779 A1 *    6/2023  Zhou ..................... G06F 1/1643
                                                    345/204

FOREIGN PATENT DOCUMENTS

| CN | 105652552 | A |   | 6/2016 | | |
|----|-----------|---|---|--------|---|---|
| CN | 111290189 | A |   | 6/2020 | | |
| CN | 111381413 | A |   | 7/2020 | | |
| CN | 112987441 | A |   | 6/2021 | | |
| KR | 100932365 | B1 | * | 12/2009 | ............. | G02F 1/167 |
| KR | 101258462 | B1 | * | 4/2013 | .......... | G02F 1/1681 |
| KR | 20150055927 | A |   | 5/2015 | | |

* cited by examiner 30 (31)   30 (32)

3

A           A'

300

41       42

411  412    421  422

2 h1  31 h2     32

1

3       411  412

41

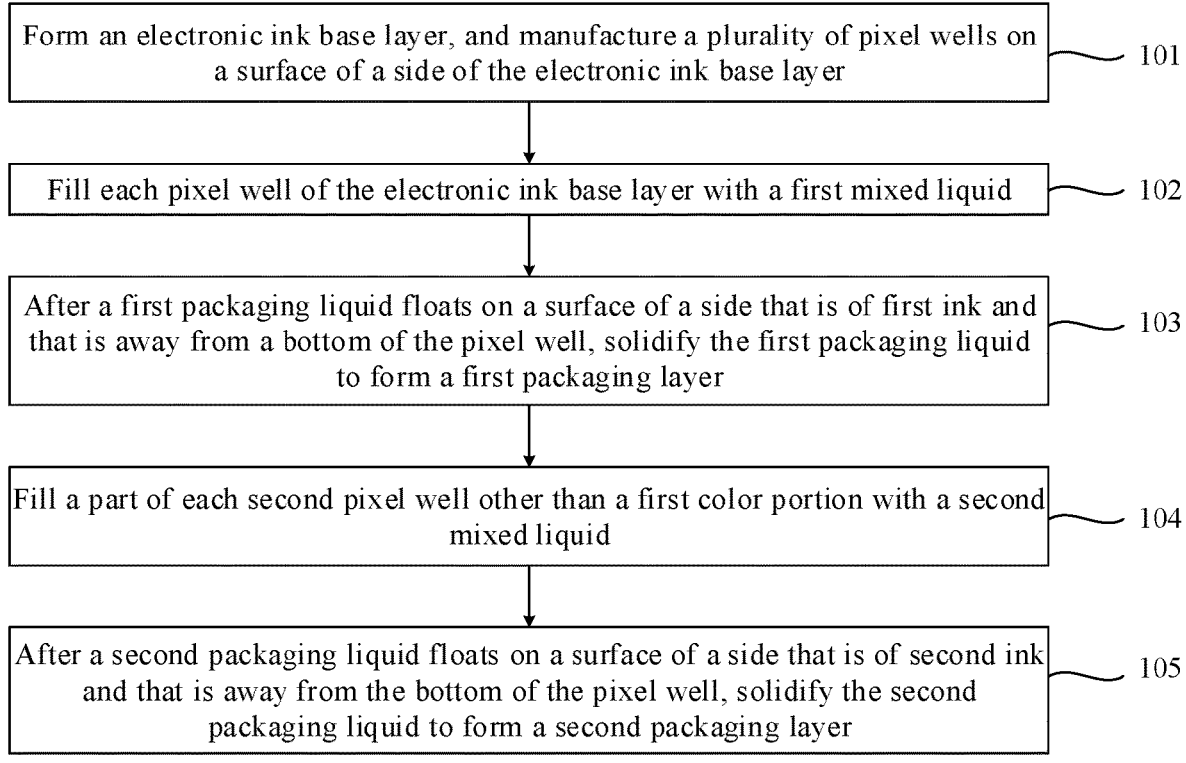

| | |
|---|---|
| Form an electronic ink base layer, and manufacture a plurality of pixel wells on a surface of a side of the electronic ink base layer | 101 |
| Fill each pixel well of the electronic ink base layer with a first mixed liquid | 102 |
| After a first packaging liquid floats on a surface of a side that is of first ink and that is away from a bottom of the pixel well, solidify the first packaging liquid to form a first packaging layer | 103 |
| Fill a part of each second pixel well other than a first color portion with a second mixed liquid | 104 |
| After a second packaging liquid floats on a surface of a side that is of second ink and that is away from the bottom of the pixel well, solidify the second packaging liquid to form a second packaging layer | 105 |

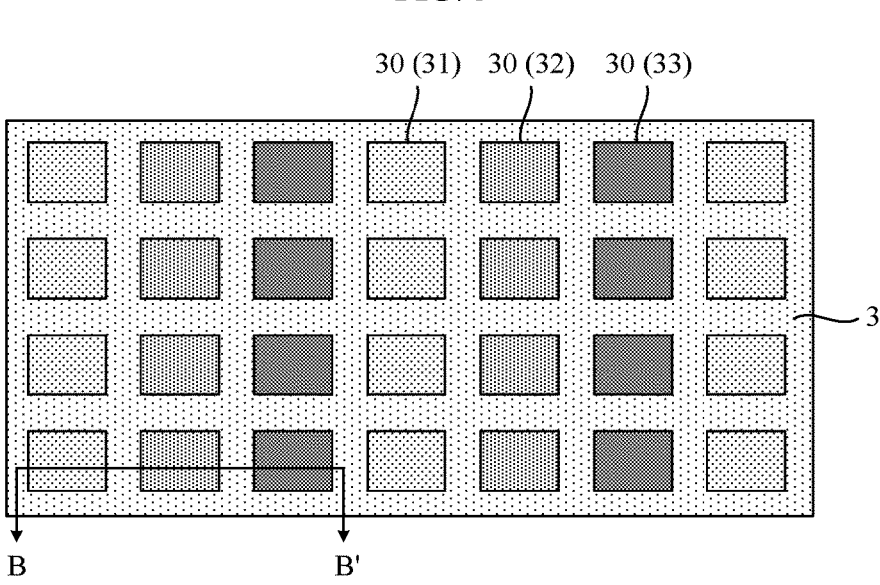

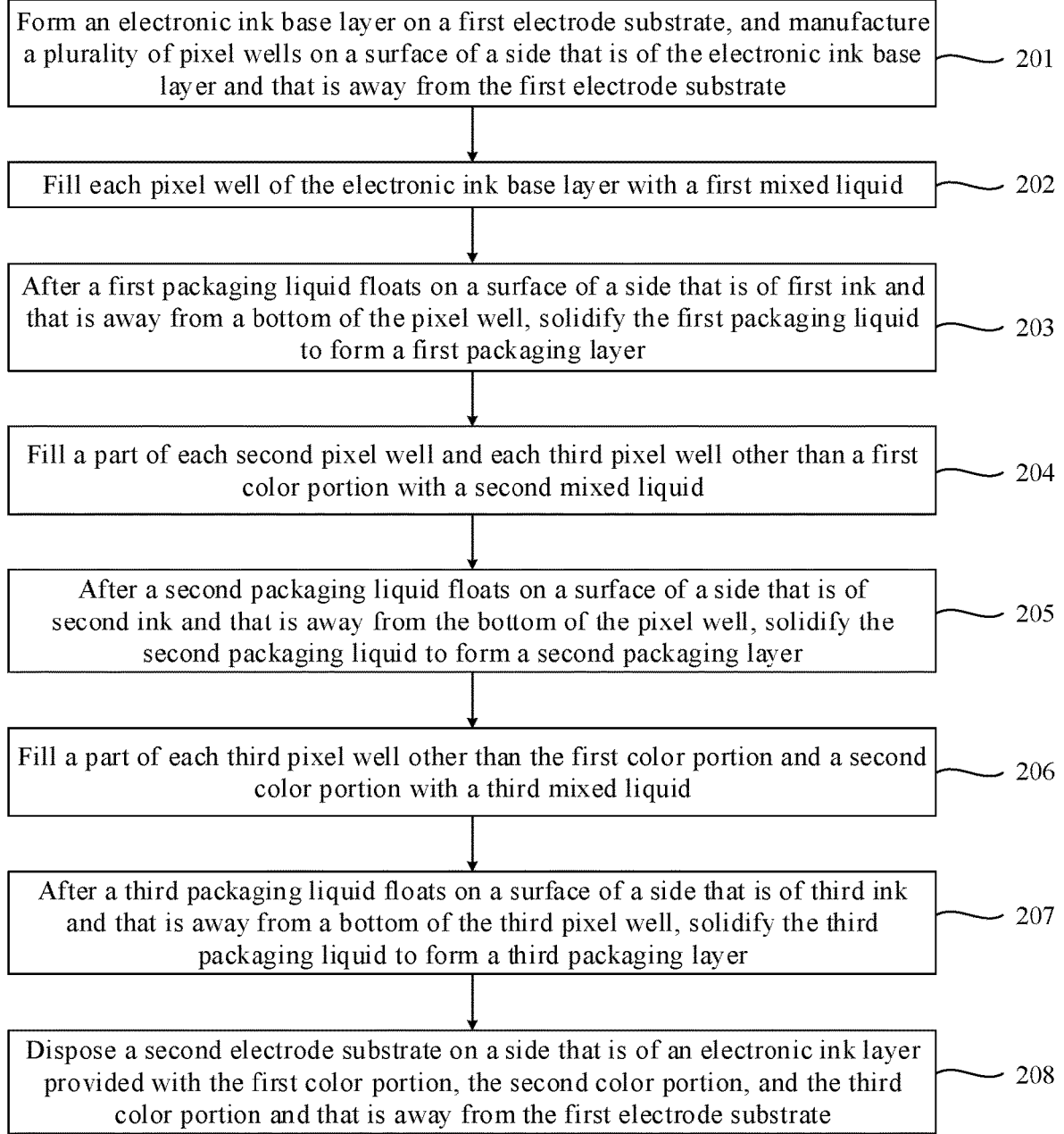

Form an electronic ink base layer on a first electrode substrate, and manufacture a plurality of pixel wells on a surface of a side that is of the electronic ink base layer and that is away from the first electrode substrate — 201

Fill each pixel well of the electronic ink base layer with a first mixed liquid — 202

After a first packaging liquid floats on a surface of a side that is of first ink and that is away from a bottom of the pixel well, solidify the first packaging liquid to form a first packaging layer — 203

Fill a part of each second pixel well and each third pixel well other than a first color portion with a second mixed liquid — 204

After a second packaging liquid floats on a surface of a side that is of second ink and that is away from the bottom of the pixel well, solidify the second packaging liquid to form a second packaging layer — 205

Fill a part of each third pixel well other than the first color portion and a second color portion with a third mixed liquid — 206

After a third packaging liquid floats on a surface of a side that is of third ink and that is away from a bottom of the third pixel well, solidify the third packaging liquid to form a third packaging layer — 207

Dispose a second electrode substrate on a side that is of an electronic ink layer provided with the first color portion, the second color portion, and the third color portion and that is away from the first electrode substrate — 208

ELECTRONIC INK DISPLAY PANEL, MANUFACTURING METHOD THEREFOR, AND ELECTRONIC DEVICE

CROSS-REFERENCE TO RELATED APPLICATIONS

This application is a national stage of International Application No. PCT/CN2022/116714, filed on Sep. 2, 2022, which claims priority to Chinese Patent Application No. 202111047546.9 filed on Sep. 8, 2021. The disclosures of both of the aforementioned application are hereby incorporated by reference in their entireties.

TECHNICAL FIELD

This application relates to the field of display technologies, and in particular, to an electronic ink display panel, a manufacturing method therefor, and an electronic device.

BACKGROUND

An electronic ink screen is increasingly applied to fields such as an electronic label and an electronic book because of advantages such as eye protection and low power consumption of the electronic ink screen. In a conventional electronic ink screen technology, only two colors, namely, black and white can be displayed. To enable the electronic ink screen to have a more vivid display effect, a color electronic paper technology starts to emerge, and the electronic ink screen can be used to implement color display. However, limited by process precision, a current electronic ink screen implements low-resolution color display.

SUMMARY

An electronic ink display panel, a manufacturing method therefor, and an electronic device are provided, so that high-resolution color display can be implemented with limited process precision.

According to a first aspect, an electronic ink display panel is provided, including: an electronic ink base layer. A light emitting surface of the electronic ink base layer includes a plurality of pixel wells, the plurality of pixel wells include a plurality of first pixel wells and a plurality of second pixel wells, and a depth of each first pixel well is less than a depth of each second pixel well; a first color portion is disposed in each pixel well in the plurality of first pixel wells and the plurality of second pixel wells, the first color portion includes first ink and a first packaging layer, the first packaging layer is located on a side that is of the first ink and that is away from a bottom of the pixel well, and in each first pixel well, the first color portion fills the first pixel well; a second color portion is further disposed in each pixel well in the plurality of second pixel wells, the second color portion is located on a side that is of the first color portion and that is away from the bottom of the pixel well, the second color portion includes second ink and a second packaging layer, and the second packaging layer is located on a side that is of the second ink and that is away from the bottom of the pixel well; and the first ink and the second ink include particles of different colors.

The electronic ink base layer is set to include a plurality of types of pixel wells with different well depths. One type of ink is filled in the pixel well and packaged each time. Different types of ink are filled for a plurality of times, so that different types of ink exist at uppermost layers of the pixel wells with different depths. Because the different types of ink include particles of different colors, different pixel wells may display different colors, to implement color display. Compared with the conventional technology, in this application, higher-resolution color display can be implemented. A reason is as follows: In a solution of this application, when a mixed liquid is filled, different pixel locations (corresponding to different types of pixel wells in this solution) do not need to be specifically selected. Therefore, locations of different pixels do not need to be located, and the mixed liquid does not need to be poured at a fixed point. In other words, high-resolution color display can be implemented without using a high-precision ink filling process.

In a possible implementation, the plurality of pixel wells further include a plurality of third pixel wells, and the depth of each second pixel well is less than a depth of each third pixel well; the first color portion and the second color portion in each second pixel well fill the second pixel well; the first color portion, the second color portion, and a third color portion are disposed in each third pixel well; in each third pixel well, the second color portion is located on a side that is of the first color portion and that is away from the bottom of the pixel well, and the third color portion is located on a side that is of the second color portion and that is away from the bottom of the pixel well; the third color portion includes third ink and a third packaging layer; and the third packaging layer is located on a side that is of the third ink and that is away from the bottom of the pixel well; and any two of the first ink, the second ink, and the third ink include particles of different colors.

In a possible implementation, the first ink includes a first color particle and a black filling liquid, the second ink includes a second color particle and a black filling liquid, and the third ink includes a third color particle and a black filling liquid. Different pixel wells display different colors, to implement color display. In addition, ink in a same color portion includes only a particle of one color, and there is no mutual interference between a large quantity of types of color particles. Therefore, a driving speed is fast. In other words, an image refreshing speed is fast.

In a possible implementation, the first ink includes a first color particle, a black particle, and a transparent filling liquid, the second ink includes a second color particle, a black particle, and a transparent filling liquid, and the third ink includes a third color particle, a black particle, and a transparent filling liquid. Different pixel wells display different colors, to implement color display. A color depth level of the pixel well is controlled, to display more colors. In addition, ink in a same color portion includes particles of only two colors, and there is no mutual interference between a large quantity of types of color particles. Therefore, a driving speed is fast. In other words, an image refreshing speed is fast.

In a possible implementation, the first color particle, the second color particle, and the third color particle include one red particle, one green particle, and one blue particle.

In a possible implementation, a hydrophobic layer is disposed on a side wall of each pixel well and/or on a surface of the light emitting surface of the electronic ink base layer. In this way, a case in which ink filled at a previous time is adhered to an inner wall of the pixel well to exert adverse impact on ink filled at a current time does not occur easily.

In a possible implementation, the electronic ink base layer is an embossing adhesive.

In a possible implementation, a material of the embossing adhesive is a resin material.

In a possible implementation, the electronic ink display panel further includes a first electrode substrate and a second electrode substrate. The electronic ink base layer is located between the first electrode substrate and the second electrode substrate. The second electrode substrate is located on a side close to the light emitting surface of the electronic ink base layer, and the second electrode substrate includes a transparent electrode layer; and the first electrode substrate is located on a side away from the light emitting surface of the electronic ink base layer, and the first electrode substrate includes a pixel electrode and a drive circuit that correspond to each pixel well.

According to a second aspect, an electronic device is provided, including the electronic ink display panel.

According to a third aspect, a manufacturing method for an electronic ink display panel is provided, including: forming an electronic ink base layer, and manufacturing a plurality of pixel wells on a surface of a side of the electronic ink base layer, to form an electronic ink base layer, where the plurality of pixel wells include a plurality of first pixel wells and a plurality of second pixel wells, and a depth of each first pixel well is less than a depth of each second pixel well; filling each pixel well of the electronic ink base layer with a first mixed liquid, where the first mixed liquid includes a first packaging liquid and first ink, the first mixed liquid fills each first pixel well, and the first mixed liquid is filled in a part of each second pixel well; after the first packaging liquid floats on a surface of a side that is of the first ink and that is away from a bottom of the pixel well, solidifying the first packaging liquid to form a first packaging layer, where the first packaging layer and the first ink form a first color portion; filling a part of each second pixel well other than the first color portion with a second mixed liquid, where the second mixed liquid includes a second packaging liquid and second ink; and after the second packaging liquid floats on a surface of a side that is of the second ink and that is away from the bottom of the pixel well, solidifying the second packaging liquid to form a second packaging layer, where the second packaging layer and the second ink form a second color portion, where the first ink and the second ink include particles of different colors.

The electronic ink base layer is set to include a plurality of types of pixel wells with different well depths. One type of ink is filled in the pixel well and packaged each time. Different types of ink are filled for a plurality of times, so that different types of ink exist at uppermost layers of the pixel wells with different depths. Because the different types of ink include particles of different colors, different pixel wells may display different colors, to implement color display. Uppermost layers of different types of pixel wells can be controlled to have corresponding types of ink only by using a depth of the pixel well. Selection does not need to be performed based on the pixel well in an ink filling process. In other words, high-resolution color display can be implemented without using a high-precision ink filling process.

In a possible implementation, the plurality of pixel wells further include a plurality of third pixel wells, and the depth of each second pixel well is less than a depth of each third pixel well; and the manufacturing method for an electronic ink display panel further includes: after the second color portion is formed, filling, in each second pixel well, the second pixel well with the first color portion and the second color portion, and filling a part of the third pixel well with the first color portion and the second color portion; filling a part of each third pixel well other than the first color portion and the second color portion with a third mixed liquid, where the third mixed liquid includes a third packaging liquid and third ink; and after the third packaging liquid floats on a surface of a side that is of the third ink and that is away from a bottom of the third pixel well, solidifying the third packaging liquid to form a third packaging layer, where the third packaging layer and the third ink form a third color portion; and any two of the first ink, the second ink, and the third ink include particles of different colors.

In a possible implementation, the process of forming an electronic ink base layer, and manufacturing a plurality of pixel wells on a surface of a side of the electronic ink base layer includes: coating an embossing adhesive, and embossing the plurality of pixel wells on the embossing adhesive by using a nano embossing process.

In a possible implementation, before the filling each pixel well of the electronic ink base layer with a first mixed liquid, the method further includes: forming a hydrophobic layer on a side wall of each pixel well and/or on a surface of a light emitting surface of the electronic ink base layer.

In a possible implementation, the first ink includes a first color particle and a black filling liquid, the second ink includes a second color particle and a black filling liquid, and the third ink includes a third color particle and a black filling liquid.

In a possible implementation, the first ink includes a first color particle, a black particle, and a transparent filling liquid, the second ink includes a second color particle, a black particle, and a transparent filling liquid, and the third ink includes a third color particle, a black particle, and a transparent filling liquid.

In a possible implementation, the first color particle, the second color particle, and the third color particle include one red particle, one green particle, and one blue particle.

BRIEF DESCRIPTION OF THE DRAWINGS

FIG. 3 is a schematic flowchart of a manufacturing method for an electronic ink display panel according to an embodiment of this application;

FIG. 4 is a top view of another electronic ink display panel according to an embodiment of this application;

FIG. 6 is a schematic flowchart of another manufacturing method for an electronic ink display panel according to an embodiment of this application;

DETAILED DESCRIPTION OF ILLUSTRATIVE EMBODIMENTS

Figure 1:
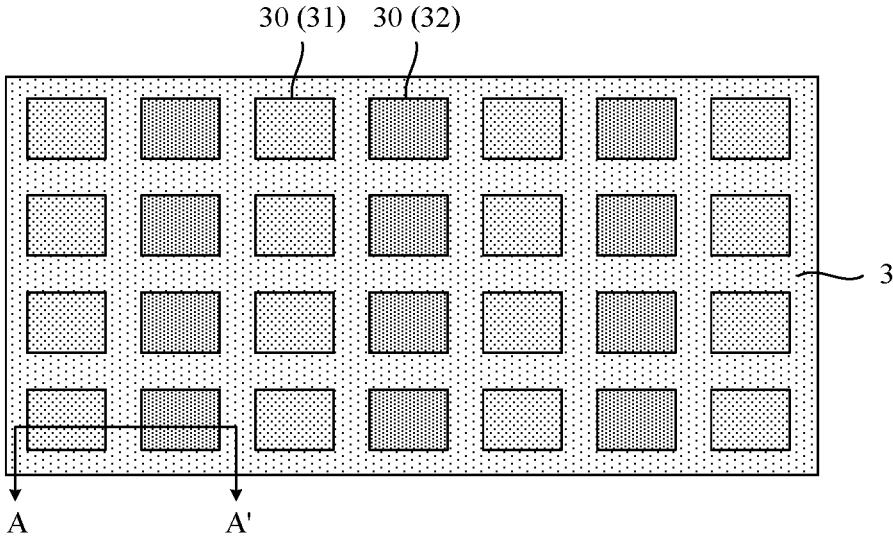
FIG. 1 is a top view of an electronic ink display panel according to an embodiment of this application.

Terms used in implementations of this application are only used to explain specific embodiments of this application, and are not intended to limit this application.

A related technology and a technical problem of the related technology are first described. A conventional electronic ink screen includes a microcapsule. The microcapsule includes a white particle with a negative charge and a black particle with a positive charge. The white particle and the black particle suspend in a liquid. The black particle or the white particle moves to the top of the microcapsule under control of a voltage between two ends of the microcapsule, to reflect light of a corresponding color. When the black particle is located at the top of the microcapsule and the white particle is located at the bottom of the microcapsule, black displayed by the microcapsule can be seen from a side of the top of the microcapsule. On the contrary, when the white particle is located at the top of the microcapsule and the black particle is located at the bottom of the microcapsule, white displayed by the microcapsule can be seen from a side of the top of the microcapsule. On the basis that two colors, namely, black and white are displayed, driven by different voltages, the black particle or the white particle may move to a specific location between the top and the bottom of the microcapsule, to further display different gray effects such as dark gray and light gray. A shorter distance of the black particle from the top and a longer distance of the white particle from the top lead to darker gray displayed by the microcapsule; and a longer distance of the black particle from the top and a shorter distance of the white particle from the top lead to lighter gray displayed by the microcapsule. In the related technology, a maximum gray scale that may be implemented through driving by a voltage is a total of 16 levels from a level 0 to a level 15. The level 0 indicates that white is displayed, the level 15 indicates that black is displayed, and the middle 14 levels correspond to different gray display effects. A color light filter film may be added on the side of the top of the microcapsule, to further implement color display. A corresponding red light filter material, a corresponding green light filter material, and a corresponding blue light filter material are respectively disposed on top ends of three originally adjacent capsule pixels, so that the three original pixels form one color pixel. Consequently, display resolution is reduced to one third of original display resolution. In addition, when the color light filter film is added, a thickness of a screen may increase, and light transmittance of the screen due to a light filter effect may decrease. In addition to adding the color light filter film, another method for implementing color display is as follows: Particles of a plurality of colors are disposed in each microcapsule, and a voltage is used to control particles of different colors, so that the microcapsule can display different colors. However, because particles of a plurality of different colors are disposed in a same microcapsule, and particles of different color types may interfere with each other in a process of being driven by a voltage to move, a display refreshing speed is low. In addition, because a quantity of particle types that need to be driven for a same microcapsule increases, all types of particles cannot be driven at a time, and a final color display effect can be achieved only after driving is performed for a plurality of times, and consequently, a display refreshing speed is low.

The following describes in detail the embodiments of this application.

Figure 2:
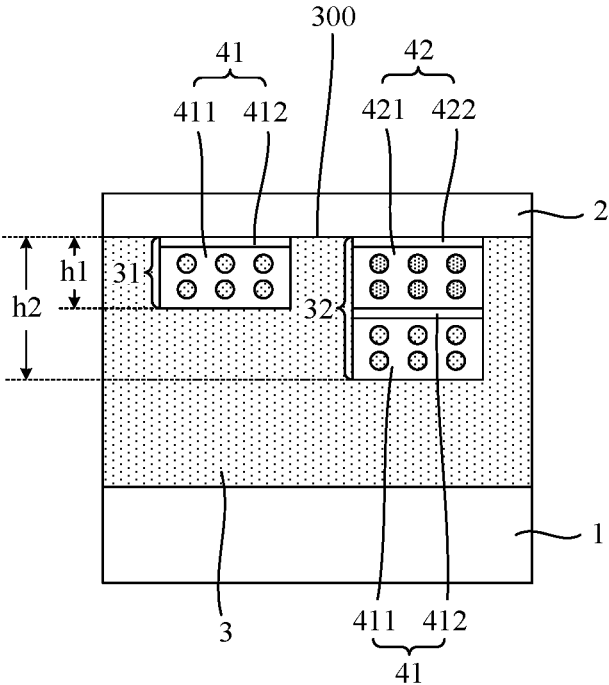
FIG. 2 is a schematic diagram of a cross-sectional structure in a direction AA' in FIG. 1.

As shown in FIG. 1 and FIG. 2, an embodiment of this application provides an electronic ink display panel, including a first electrode substrate 1, a second electrode substrate 2, and an electronic ink base layer 3 between the first electrode substrate 1 and the second electrode substrate 2. A light emitting surface 300 of the electronic ink base layer 3 includes a plurality of pixel wells 30, the plurality of pixel wells 30 include a plurality of first pixel wells 31 and a plurality of second pixel wells 32, and a depth h1 of each first pixel well 31 is less than a depth h2 of each second pixel well 32. A first color portion 41 is disposed in each pixel well in the plurality of first pixel wells 31 and the plurality of second pixel wells 32, the first color portion 41 includes first ink 411 and a first packaging layer 412, the first packaging layer 412 is located on a side that is of the first ink 411 and that is away from a bottom of the pixel well, and in each first pixel well 31, the first color portion 41 fills the first pixel well 31. A second color portion 42 is further disposed in each pixel well in the plurality of second pixel wells 32 and a plurality of third pixel wells 33, the second color portion 42 is located on a side that is of the first color portion 41 and that is away from the bottom of the pixel well, the second color portion 42 includes second ink 421 and a second packaging layer 422, and the second packaging layer 422 is located on a side that is of the second ink 421 and that is away from the bottom of the pixel well. The first ink 411 and the second ink 421 include particles of different colors. The electronic ink base layer 3, the first color portion 41, and the second color portion 42 form an electronic ink layer.

Specifically, for the first pixel well 31 and the second pixel well 32, different types of pixel wells have different depths. For example, h1:h2=1:2. It can be understood that, in another implementable implementation, a depth ratio between the different types of pixel wells may be adjusted based on a process requirement. However, it needs to be ensured that h1<h2. In addition, a specific structure of the pixel well 30 is not limited in this embodiment of this application. For example, a shape of the pixel well 30 may be a rectangle, a circle, or the like on a pixel well section that is parallel to a plane on which the display panel is located. The first electrode substrate 1 and the second electrode substrate 2 are configured to generate a corresponding electric field in each pixel well 30, to control a color displayed by ink in the pixel well 30.

The following describes the electronic ink display panel with reference to a manufacturing method for an electronic ink display panel. As shown in FIG. 3, an embodiment of this application further provides a manufacturing method for an electronic ink display panel, including the following steps.

Step 101: Form an electronic ink base layer, and manufacture a plurality of pixel wells 30 on a surface of a side of the electronic ink base layer, where the plurality of pixel wells 30 include a plurality of first pixel wells 31 and a plurality of second pixel wells 32, a depth h1 of each first pixel well 31 is less than a depth h2 of each second pixel well 32, for example, h1:h2=1:2, and a side that the pixel well 30 faces is a side of a light emitting surface 300 of the electronic ink base layer 3.

Step 102: Fill each pixel well 30 of the electronic ink base layer 3 with a first mixed liquid, where the first mixed liquid includes a first packaging liquid and first ink 411, the first mixed liquid fills each first pixel well 31, and the first mixed liquid is filled in a part of each second pixel well 32. For example, the first mixed liquid is filled in the second pixel well 32 by a half of the depth h2. The first mixed liquid may be filled in each pixel well 30 without a need to control a filling location of the first mixed liquid. The first mixed liquid may be specifically filled in each pixel well 30 by using processes such as printing, spraying, and coating (coating), without a need to be controlled by using a high-precision process. After the first mixed liquid is filled, no mixed liquid remains on the light emitting surface 300 of the electronic ink base layer 3 except for a location of the pixel well 30. Even if there is a small residue, no adverse impact is exerted on a subsequent process or subsequent display. In addition, in a possible implementation, a hydrophobic layer may be disposed on a surface of the light emitting surface 300 of the electronic ink base layer 3, to reduce the residue as much as possible.

Step 103: After the first packaging liquid floats on a surface of a side that is of the first ink 411 and that is away from a bottom of the pixel well, solidify the first packaging liquid to form a first packaging layer 412, where the first packaging layer 412 and the first ink 411 form a first color portion 41, and a density of the first packaging liquid is less than a density of the first ink 411. Therefore, after the first mixed liquid is filled in the pixel well 30, the first packaging liquid floats on a surface of the first ink 411 due to a smaller density. In this case, the first packaging liquid may be solidified by using a process such as ultraviolet radiation or heating, to form the first packaging layer 412, so as to package the first ink 411. After the first packaging layer 412 is solidified, a surface of the electronic ink base layer 3 may be cleaned, to clean off an ink residue that may exist on a part of the surface of the light emitting surface 300 of the electronic ink base layer 3 other than the pixel well 30.

Step 104: Fill a part of each second pixel well 32 other than the first color portion 41 with a second mixed liquid, where the second mixed liquid includes a second packaging liquid and second ink 421. A process of filling the second mixed liquid may be the same as a process of filling the first mixed liquid. Because the first color portion 41 has filled the first pixel well 31, the second mixed liquid is not filled. The second mixed liquid is filled in the second pixel well 32 that still has space. For a process of filling the second mixed liquid, the pixel well 30 does not need to be selected. A control precision requirement for filling the second mixed liquid is low. The second mixed liquid may be filled in the second pixel well 32 by controlling depths of different pixel wells 30.

Step 105: After the second packaging liquid floats on a surface of a side that is of the second ink 421 and that is away from the bottom of the pixel well, solidify the second packaging liquid to form a second packaging layer 422, where the second packaging layer 422 and the second ink 421 form a second color portion 42. In this case, from the side of the light emitting surface 300 of the electronic ink base layer 3, the first ink 411 in all the first pixel wells 31 may be seen, and the second ink 421 in all the second pixel wells 32 may be seen. In each second pixel well 32, the first ink 411 is blocked by the upper-layer second ink 421, and the first ink 411 and the second ink 421 include particles of different colors.

Specifically, because the first ink 411 and the second ink 421 include particles of different colors, the first ink 411 and the second ink 421 may display different colors under control of a voltage. For example, the first ink 411 may display red, and the second ink 421 may display green. For the electronic ink base layer 3, from the side of the light emitting surface 300, the red displayed by the first ink 411 may be seen by using the first pixel well 31, and the green displayed by the second ink 421 may be seen by using the second pixel well 32. In other words, subpixels of three colors, namely, red and green are set, and color display is further implemented. In other words, different pixel wells display different colors by designing well depths of the different pixel wells.

According to the electronic ink display panel and the manufacturing method therefor in this embodiment of this application, the electronic ink base layer is set to include a plurality of types of pixel wells with different well depths. One type of ink is filled in the pixel well and packaged each time. Different types of ink are filled for a plurality of times, so that different types of ink exist at uppermost layers of the pixel wells with different depths. Because the different types of ink include particles of different colors, different pixel wells may display different colors, to implement color display. Compared with a conventional technology, in this application, higher-resolution color display can be implemented. A reason is as follows: In a solution of this application, when a mixed liquid is filled, different pixel locations (corresponding to different types of pixel wells in this solution) do not need to be specifically selected. Therefore, locations of different pixels do not need to be located, and the mixed liquid does not need to be poured at a fixed point. In other words, high-resolution color display can be implemented without using a high-precision ink filling process. Compared with a related technology, color display may be implemented without a need to add a color light filter film, to avoid a case in which light transmittance decreases and a thickness increases because the color light filter film is added. In addition, for a technology in which the color light filter film is added, a high-precision color light filter film manufacturing process is required to implement high-resolution display, and corresponding color light filter films can be separately disposed for subpixels of different colors only by using the high-precision color light filter film manufacturing process. However, in this embodiment of this application, for different types of ink, high process precision is not required. The first pixel well may selectively display a type of ink color, and the second pixel may selectively display another type of ink color, to implement high-resolution color display. In addition, particles of different colors are disposed in different color portions to implement color display. There is no need to dispose a large quantity of color types of particles in a same color portion. In a process of driving the particles in a same color portion, the particles in a same color portion do not interfere with each other due to a large quantity of color types, and the particles in a same color portion may be driven for a small quantity of times to move to a required location. Therefore, an image refreshing speed is high.

Figure 5:
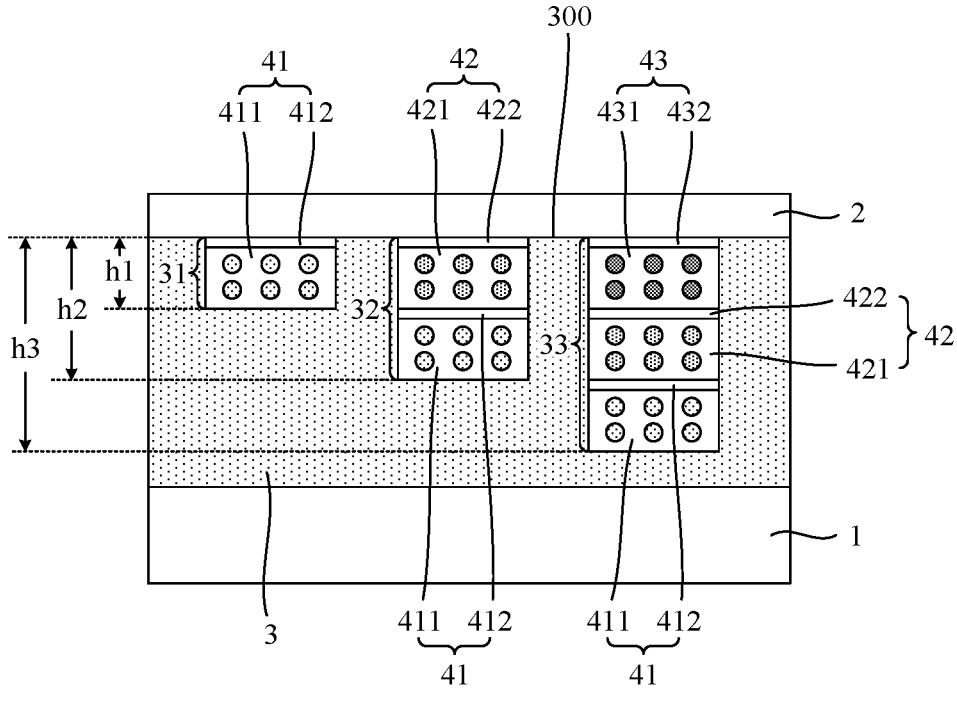
FIG. 5 is a schematic diagram of a cross-sectional structure in a direction BB' in FIG. 4.

In a possible implementation, as shown in FIG. 4 and FIG. 5, the plurality of pixel wells 30 further include a plurality of third pixel wells 33, and the depth h2 of each second pixel well 32 is less than a depth h3 of each third pixel well 33; the first color portion 41 and the second color portion 42 in each second pixel well 32 fill the second pixel well 32; the first color portion 41, the second color portion 42, and a third color portion 43 are disposed in each third pixel well 33; in each third pixel well 33, the second color portion 42 is located on a side that is of the first color portion 41 and that is away from the bottom of the pixel well, and the third color portion 43 is located on a side that is of the second color portion 42 and that is away from the bottom of the pixel well; the third color portion 43 includes third ink 431 and a third packaging layer 432; and the third packaging layer 432 is located on a side that is of the third ink 431 and that is away from the bottom of the pixel well; and any two of the first ink 411, the second ink 421, and the third ink 431 include particles of different colors. The electronic ink base layer 3, the first color portion 41, the second color portion 42, and the third color portion 43 form an electronic ink layer.

The following describes the electronic ink display panel with reference to a manufacturing method for an electronic ink display panel. As shown in FIG. 6, an embodiment of this application further provides a manufacturing method for an electronic ink display panel, including the following steps.

Figures 7, 8:
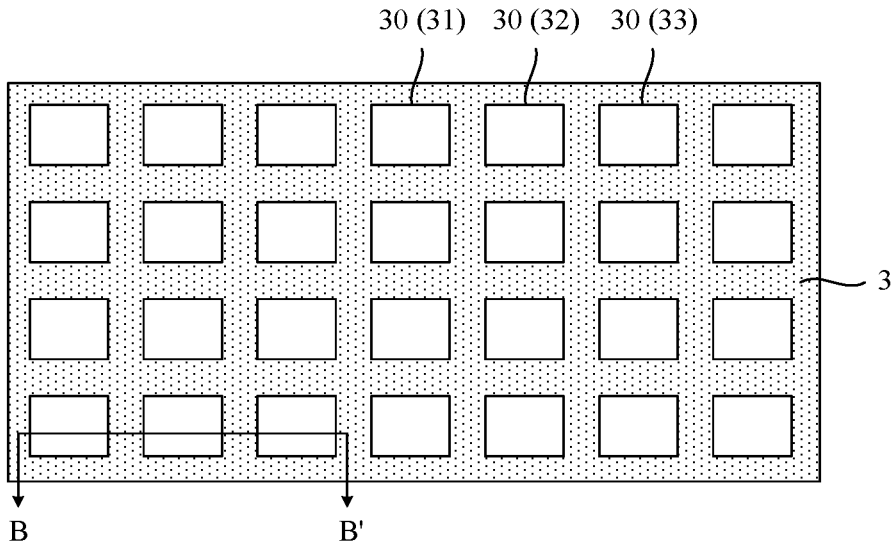
FIG. 7 is a top view of an electronic ink base layer according to an embodiment of this application.
FIG. 8 is a schematic diagram of a cross-sectional structure in a direction BB' in FIG. 7.

Step 201: As shown in FIG. 7 and FIG. 8, form an electronic ink base layer 3 on a first electrode substrate 1, and manufacture a plurality of pixel wells 30 on a surface of a side that is of the electronic ink base layer 3 and that is away from the first electrode substrate 1, where the plurality of pixel wells 30 include a plurality of first pixel wells 31, a plurality of second pixel wells 32, and a plurality of third pixel wells 33, a depth h1 of each first pixel well 31 is less than a depth h2 of each second pixel well 32, and the depth h2 of each second pixel well 32 is less than a depth h3 of each third pixel well 33. The following provides descriptions by using h1:h2:h3=1:2:3 as an example.

Figure 9:
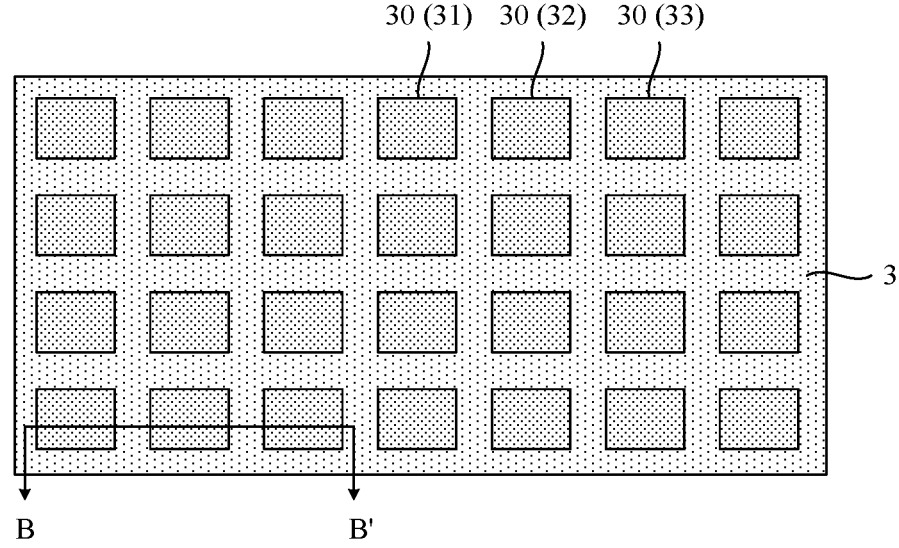
FIG. 9 is a top view of an electronic ink base layer including a first color portion according to an embodiment of this application.
Figure 10:
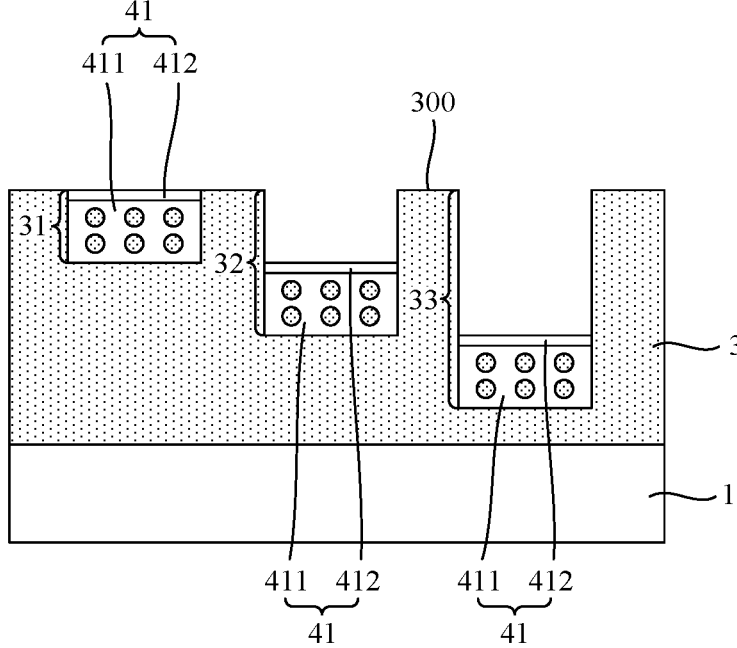
FIG. 10 is a schematic diagram of a cross-sectional structure in a direction BB' in FIG. 9.

Step 202: As shown in FIG. 9 and FIG. 10, fill each pixel well 30 of the electronic ink base layer 3 with a first mixed liquid, where the first mixed liquid includes a first packaging liquid and first ink 411, the first mixed liquid fills each first pixel well 31, and the first mixed liquid is filled in a part of each second pixel well 32. For example, the first mixed liquid is filled in the second pixel well 32 by a half of the depth h2. The first mixed liquid is filled in a part of each third pixel well 33. For example, the first mixed liquid is filled in the third pixel well 33 by one third of the depth h3. The first mixed liquid may be filled in the pixel well 30 by using a process such as printing, spraying, or coating (coating), and the pixel well 30 does not need to be selected. A precision control requirement of filling in the first mixed liquid is low, provided that an equal amount of first mixed liquids are filled in all the pixel wells 30. There is no need to perform controlling by using a high-precision process. After the first mixed liquid is filled, no mixed liquid remains on the light emitting surface 300 of the electronic ink base layer 3 except for a location of the pixel well 30. Even if there is a small residue, no adverse impact is exerted on a subsequent process or subsequent display. In addition, in a possible implementation, a hydrophobic layer may be disposed on a surface of the light emitting surface 300 of the electronic ink base layer 3, to reduce the residue as much as possible.

Step 203: After the first packaging liquid floats on a surface of a side that is of the first ink 411 and that is away from a bottom of the pixel well, solidify the first packaging liquid to form a first packaging layer 412, where the first packaging layer 412 and the first ink 411 form a first color portion 41, and a density of the first packaging liquid is less than a density of the first ink 411. Therefore, after the first mixed liquid is filled in the pixel well 30, the first packaging liquid floats on a surface of the first ink 411 due to a smaller density. In this case, the first packaging liquid may be solidified by using a process such as ultraviolet radiation or heating, to form the first packaging layer 412, so as to package the first ink 411. In this case, first ink 411 in all the pixel wells 30 may be seen from a side of the light emitting surface 300 of the electronic ink base layer 3. After the first packaging layer 412 is solidified, a surface of the electronic ink base layer 3 may be cleaned, to clean off an ink residue that may exist on a part of the surface of the light emitting surface 300 of the electronic ink base layer 3 other than the pixel well 30.

Figure 11:
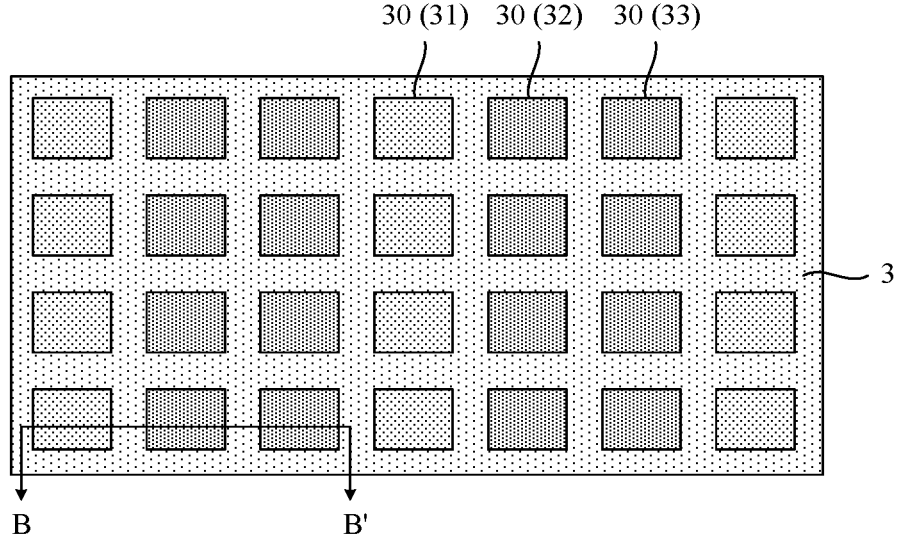
FIG. 11 is a top view of an electronic ink base layer including a second color portion according to an embodiment of this application.
Figure 12:
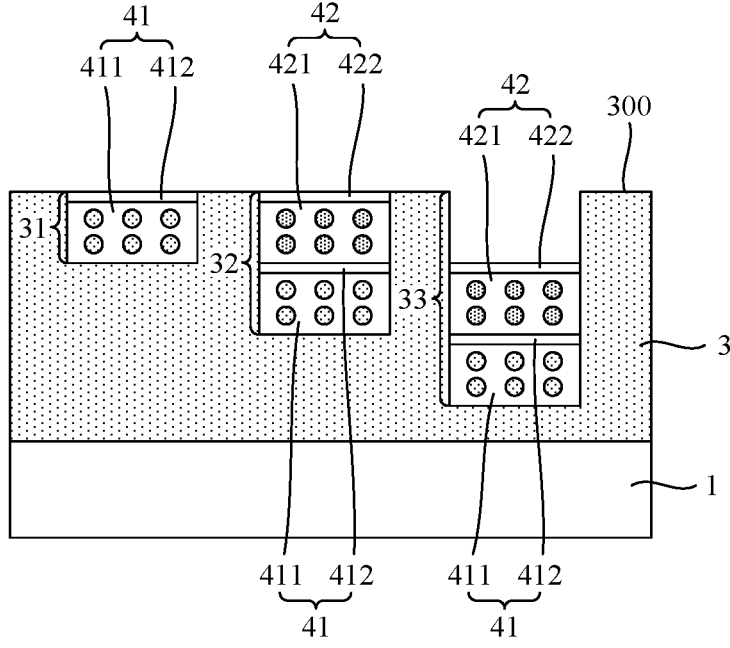
FIG. 12 is a schematic diagram of a cross-sectional structure in a direction BB' in FIG. 11.

Step 204: As shown in FIG. 11 and FIG. 12, fill a part of each second pixel well 32 and each third pixel well 33 other than the first color portion 41 with a second mixed liquid, where the second mixed liquid includes a second packaging liquid and second ink 421. In each second pixel well 32, the second mixed liquid and the first color portion 41 fill each second pixel well 32. In each third pixel well 33, the second mixed liquid and the first color portion 41 are filled in a part of the pixel well. A process of filling the second mixed liquid may be the same as a process of filling the first mixed liquid. Because the first color portion 41 has filled the first pixel well 31, the second mixed liquid is not filled. The second mixed liquid is filled in the second pixel well 32 and the third pixel well 33 that still have space. The second mixed liquid and the first color portion 41 fill the second pixel well 32. The second mixed liquid and the first color portion 41 are filled in the third pixel well 33 by two thirds of the depth. For a process of filling the second mixed liquid, the pixel well 30 does not need to be selected. A precision requirement for filling the second mixed liquid is low. The second mixed liquid may be filled in the second pixel well 32 and the third pixel well 33 by controlling depths of different pixel wells 30. Similarly, after the second mixed liquid is filled, no mixed liquid remains on the light emitting surface 300 of the electronic ink base layer 3 except for a location of the pixel well 30. Even if there is a small residue, no adverse impact is exerted on a subsequent process or subsequent display.

Step 205: After the second packaging liquid floats on a surface of a side that is of the second ink 421 and that is away from the bottom of the pixel well, solidify the second packaging liquid to form a second packaging layer 422, where the second packaging layer 422 and the second ink 421 form a second color portion 42. In this case, from the side of the light emitting surface 300 of the electronic ink base layer 3, the first ink 411 in all the first pixel wells 31 may be seen, and the second ink 421 in all the second pixel wells 32 and all the third pixel wells 33 may be seen. In each second pixel well 32 and each third pixel well 33, the first ink 411 is blocked by the upper-layer second ink 421. After the second packaging layer 422 is solidified, a surface of the electronic ink base layer 3 may be cleaned, to clean off the ink residue that may exist on a part of the surface of the light emitting surface 300 of the electronic ink base layer 3 other than the pixel well 30.

Step 206: As shown in FIG. 4 and FIG. 5, fill a part of each third pixel well 33 other than the first color portion 41 and the second color portion 42 with a third mixed liquid, where the third mixed liquid includes a third packaging liquid and third ink 431, and any two of the first ink 411, the second ink 421, and the third ink 431 include particles of different colors. For a process of filling the third mixed liquid, the pixel well 30 does not need to be selected. A control precision requirement for filling the third mixed liquid is low. The third mixed liquid may be filled in the third pixel well 33 by controlling depths of different pixel wells 30.

Step 207: As shown in FIG. 4 and FIG. 5, after the third packaging liquid floats on a surface of a side that is of the third ink 431 and that is away from the third pixel well 33, solidify the third packaging liquid to form the third packaging layer 432, where the third packaging layer 432 and the third ink 431 form the third color portion 43. In this case, from the side of the light emitting surface 300 of the electronic ink base layer 3, the first ink 411 in all the first pixel wells 31 may be seen, and the second ink 421 in all the second pixel wells 32 may be seen. In each second pixel well 32, the first ink 411 is blocked by the upper-layer second ink 421, and the third ink 431 in all the third pixel wells 33 may be seen. In each third pixel well 33, the first ink 411 and the second ink 421 are both blocked by the upper-layer third ink 431.

Step 208: As shown in FIG. 4 and FIG. 5, dispose a second electrode substrate 2 on a side that is of the electronic ink base layer 3 provided with the first color portion 41, the second color portion 42, and the third color portion 43 and that is away from the first electrode substrate 1.

Specifically, because any two of the first ink 411, the second ink 421, and the third ink 431 include particles of different colors, the first ink 411, the second ink 421, and the third ink 431 may display different colors under control of a voltage. For example, the first ink 411 may display red, the second ink 421 may display green, and the third ink 431 may display blue. For the electronic ink base layer 3, from the side of the light emitting surface 300, the red displayed by the first ink 411 may be seen by using the first pixel well 31, the green displayed by the second ink 421 may be seen by using the second pixel well 32, and the blue displayed by the third ink 431 may be seen by using the third pixel well 33. In other words, subpixels of three colors, namely, red, green, and blue are set, and color display is further implemented. In other words, different pixel wells display different colors by designing well depths of the different pixel wells.

According to the electronic ink display panel and the manufacturing method therefor in this embodiment of this application, the electronic ink base layer is set to include a plurality of types of pixel wells with different well depths. One type of ink is filled in the pixel well and packaged each time. Different types of ink are filled for a plurality of times, so that different types of ink exist at uppermost layers of the pixel wells with different depths. Because the different types of ink include particles of different colors, different pixel wells may display different colors, to implement color display. Compared with a conventional technology, in this application, higher-resolution color display can be implemented. A reason is as follows: In a solution of this application, when a mixed liquid is filled, different pixel locations (corresponding to different types of pixel wells in this solution) do not need to be specifically selected. Therefore, locations of different pixels do not need to be located, and the mixed liquid does not need to be poured at a fixed point. In other words, high-resolution color display can be implemented without using a high-precision ink filling process. Compared with a related technology, color display may be implemented without a need to add a color light filter film, to avoid a case in which light transmittance decreases and a thickness increases because the color light filter film is added. In addition, for a technology in which the color light filter film is added, a high-precision color light filter film manufacturing process is required to implement high-resolution display, and light filters corresponding to different colors can be separately disposed for subpixels of the different colors only by using the high-precision color light filter film manufacturing process. However, in this embodiment of this application, for different types of ink, high process precision is not required. The first pixel well may selectively display a type of ink color, and the second pixel may selectively display another type of ink color, to implement high-resolution color display. In addition, particles of different colors are disposed in different color portions to implement color display. There is no need to dispose a large quantity of color types of particles in a same color portion. In a process of driving the particles in a same color portion, the particles in a same color portion do not interfere with each other due to a large quantity of color types, and the particles in a same color portion may be driven for a small quantity of times to move to a required location. Therefore, an image refreshing speed is high.

Figure 13:
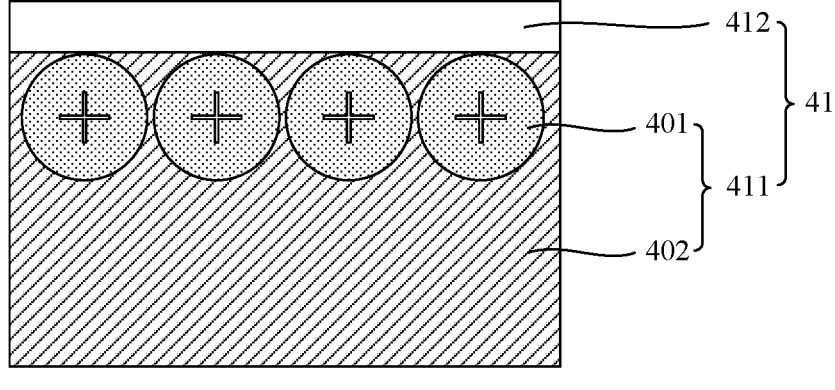
FIG. 13 is a schematic diagram of a state of a first color portion according to an embodiment of this application.
Figure 14:
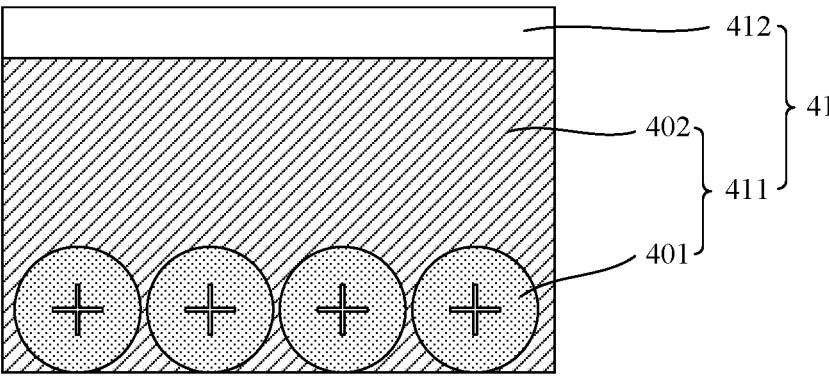
FIG. 14 is a schematic diagram of another state of the first color portion in FIG. 13.

In a possible implementation, as shown in FIG. 13 and FIG. 14, the first ink 411 includes a first color particle 401 and a black filling liquid 402, the second ink includes a second color particle and a black filling liquid, and the third ink includes a third color particle and a black filling liquid.

Figure 15:
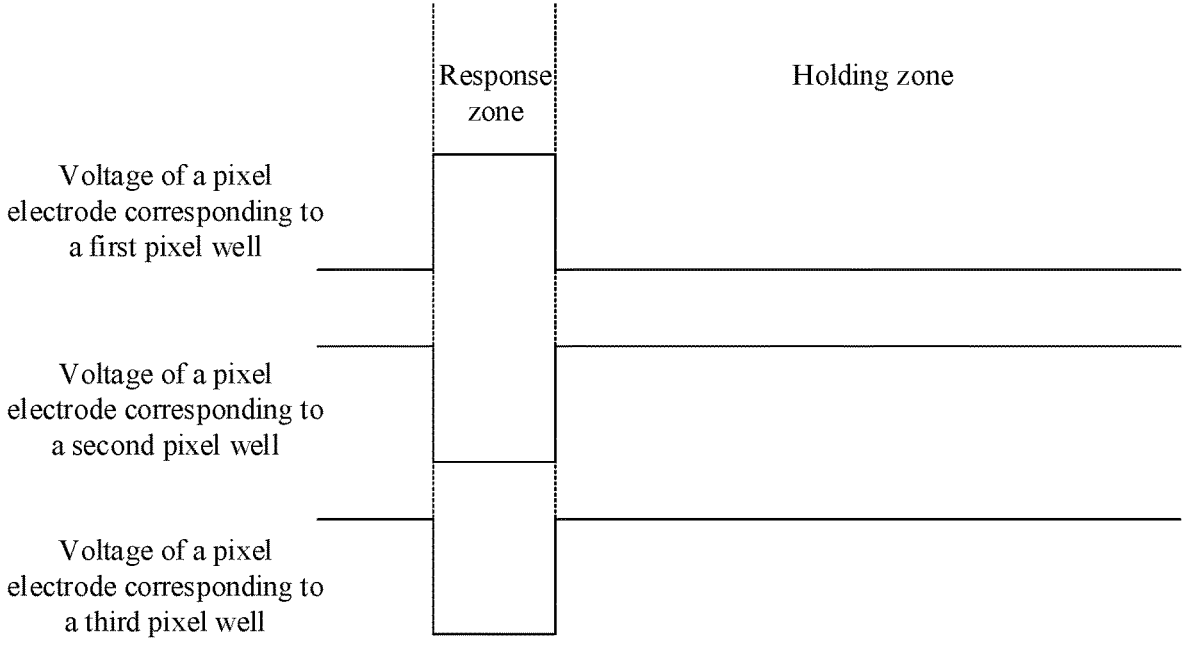
FIG. 15 is a timing diagram of voltages of pixel electrodes corresponding to different pixel wells according to an embodiment of this application.

Specifically, it is assumed that the first color particle 401 is a red particle, and it is assumed that the red particle has a positive charge. When a positive voltage is applied to an electrode below the first color portion 41, a particle with a positive charge is repelled, so that the first color particle 401 gathers on an upper surface of the black filling liquid 402. Because the first color particle 401 reflects red, when the first pixel well 31 is viewed from a side of the light emitting surface of the electronic ink base layer, the first color portion 41 displays red. When a negative voltage is applied to an electrode below the first color portion 41, a particle with a positive charge is attracted, so that the first color particle 401 gathers at a bottom of the black filling liquid 402. In this case, when the first pixel well 31 is viewed from the side of the light emitting surface of the electronic ink base layer, the first color portion 41 displays black. Different types of ink have different display principles, and details are not described herein again. Different pixel wells display different colors, to implement color display. In addition, ink in a same color portion includes only a particle of one color, and there is no mutual interference between a large quantity of types of color particles. Therefore, a driving speed is fast. In other words, an image refreshing speed is fast. In addition, in the second color portion 42 or the third color portion 43, the black filling liquid may further block another color portion at a lower part in a same pixel well, to avoid a case in which a particle of another color reflects light and crosstalk between different colors is caused. As shown in FIG. 15, for example, a red image is displayed. An electrode of the second electrode substrate is grounded. The first electrode substrate includes a pixel electrode corresponding to each pixel well. In a time period of a response zone, a voltage of a pixel electrode corresponding to the first pixel well is a positive voltage, to drive the first pixel well to display red, and a voltage of a pixel electrode corresponding to the second pixel well and a voltage of a pixel electrode corresponding to the third pixel well are negative voltages, to drive the second pixel well and the third pixel well to display black. In this case, the red image is displayed. In a time period of a holding zone, no voltage may be applied to each pixel electrode, and a particle of ink in each color portion is held at a location existing in a previous response. Even if the pixel well still keeps displaying red, power consumption can be reduced by using a bistable feature.

Figure 16:
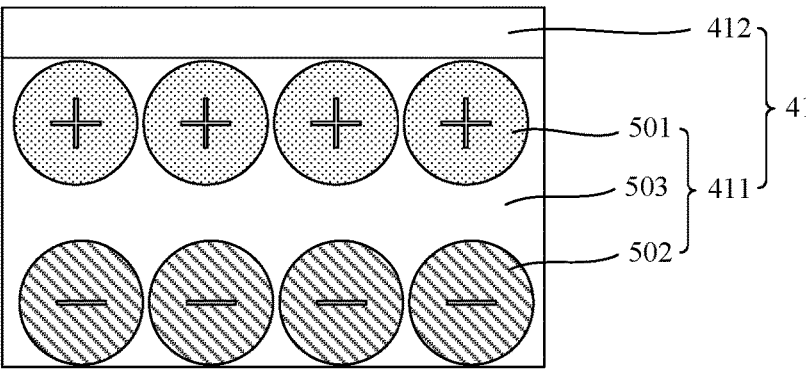
FIG. 16 is a schematic diagram of a state of another first color portion according to an embodiment of this application.
Figure 17:
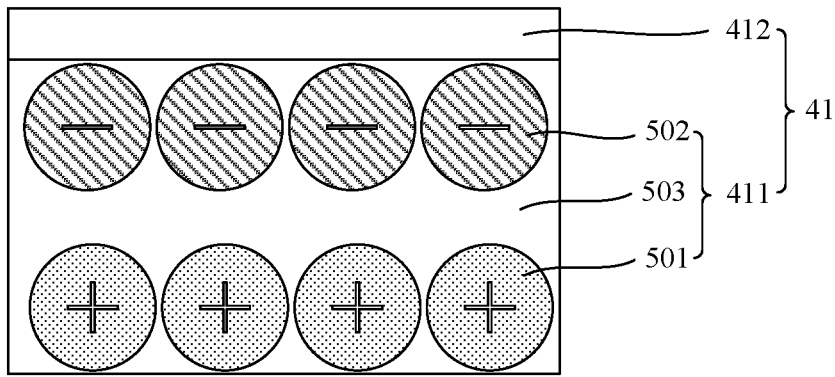
FIG. 17 is a schematic diagram of another state of the first color portion in FIG. 16.

In a possible implementation, as shown in FIG. 16 and FIG. 17, the first ink 411 includes a first color particle 501, a black particle 502, and a transparent filling liquid 503, the second ink includes a second color particle, a black particle, and a transparent filling liquid, and the third ink includes a third color particle, a black particle, and a transparent filling liquid.

Specifically, it is assumed that the first color particle 501 is a red particle, it is assumed that the red particle has a positive charge, and it is assumed that the black particle 502 has a negative charge. When a positive voltage is applied to an electrode below the first color portion 41, a particle with a positive charge is repelled, and a particle with a negative charge is attracted, so that the first color particle 401 gathers on an upper surface of the transparent filling liquid 503, and the black particle 502 gathers at a bottom of the transparent filling liquid 503. Because the first color particle 501 reflects red, when the first pixel well 31 is viewed from the side of the light emitting surface 300 of the electronic ink base layer, the first color portion 41 displays red. When a negative voltage is applied to an electrode below the first color portion 41, a particle with a positive charge is attracted, and a particle with a negative charge is repelled, so that the first color particle 501 gathers at a bottom of the transparent filling liquid 503, and the black particle 502 gathers on an upper surface of the transparent filling liquid 503. In this case, when the first pixel well 31 is viewed from the side of the light emitting surface 300 of the electronic ink base layer, the first color portion 41 displays black. In addition, ink including a red particle, a black particle, and a transparent filling liquid is used as an example. In addition to red display and black display in the two states, display of more colors can be implemented on the basis of color display. The red particle or the black particle may move to a location in the middle of the transparent filling liquid under control of different voltage values provided by the first electrode substrate. A shorter distance of the red particle from the top of the transparent filling liquid and a longer distance of the black particle from the top of the transparent filling liquid lead to darker red displayed by the first color portion 41 when the first pixel well 31 is viewed from the side of the light emitting surface of the electronic ink base layer. On the contrary, a longer distance of the red particle from the top of the transparent filling liquid and a shorter distance of the black particle from the top of the transparent filling liquid lead to darker black displayed by the first color portion 41 when the first pixel well 31 is viewed from the side of the light emitting surface of the electronic ink base layer. Different display effects of a total of 16 levels such as a level 0 to a level 15 may be implemented through voltage driving. The level 0 indicates that red is displayed, the level 15 indicates that black is displayed, and the middle 14 levels correspond to a display effect of gradually changing from red to black. Different types of ink have different display principles, and details are not described herein again. Different pixel wells display different colors, to implement color display. A color depth level of the pixel well is controlled, to display more colors. In addition, ink in a same color portion includes particles of only two colors, and there is no mutual interference between a large quantity of types of color particles. Therefore, a driving speed is fast. In other words, an image refreshing speed is fast.

In a possible implementation, the first color particle, the second color particle, and the third color particle include one red particle, one green particle, and one blue particle. Even if the first ink 411 in the first color portion 41 may display red, the second ink 421 in the second color portion 42 may display green, and the third ink 431 in the third color portion 43 may implement blue, the three adjacent pixel wells that respectively display red, green, and blue are used as a subpixel combination, to display a color pixel. That a shape of the pixel well 30 is a square is used as an example. Sizes of different types of pixel wells may be adjusted based on a requirement, and the sizes of the different types of pixel wells may be the same or different. For example, a side length of an opening of the first pixel well 31 used to display red may be 100 μm, and a side length of an opening of the second pixel well 32 used to display green may be 105 μm. Light emitting intensity may be controlled by using openings of different sizes, and light reflectivity of particles of different colors may be different. For example, reflectivity of the red particle is greater than reflectivity of the green particle. In this case, an area of the opening of the second pixel well 32 may be set to be greater than an area of the opening of the first pixel well 31, so that when reflectivity of particles of different colors is different, emitted light is enabled to have same intensity as much as possible, to achieve a more even display effect.

In a possible implementation, a hydrophobic layer is disposed on a side wall of each pixel well and/or on a surface of the light emitting surface 300 of the electronic ink base layer 3. For the second pixel well 32 and the third pixel well 33, different ink is filled in each pixel well for a plurality of times. Therefore, the hydrophobic layer may be disposed on the side wall of the pixel well. In this way, a case in which ink filled at a previous time is adhered to an inner wall of the pixel well to exert adverse impact on ink filled at a current time does not occur easily. For the hydrophobic layer disposed on the surface of the light emitting surface 300 of the electronic ink base layer 3, in a process in which the mixed liquid is filled in the pixel well 30, residues of the mixed liquid on a surface of the electronic ink base layer 3 other than the pixel well 30 may be reduced as much as possible, to avoid a case in which the mixed liquid remains and exerts adverse impact on a subsequent process or display effect.

In a possible implementation, the electronic ink base layer 3 is an embossing adhesive. Based on the embossing adhesive, the pixel well 30 may be formed in cooperation with a nano embossing technology. The nano embossing technology has high precision, and may implement manufacturing of a high-resolution pixel well 30. In addition, controlling precision of a well depth of the pixel well 30 is high.

In a possible implementation, a material of the embossing adhesive is a resin material.

Figure 18:
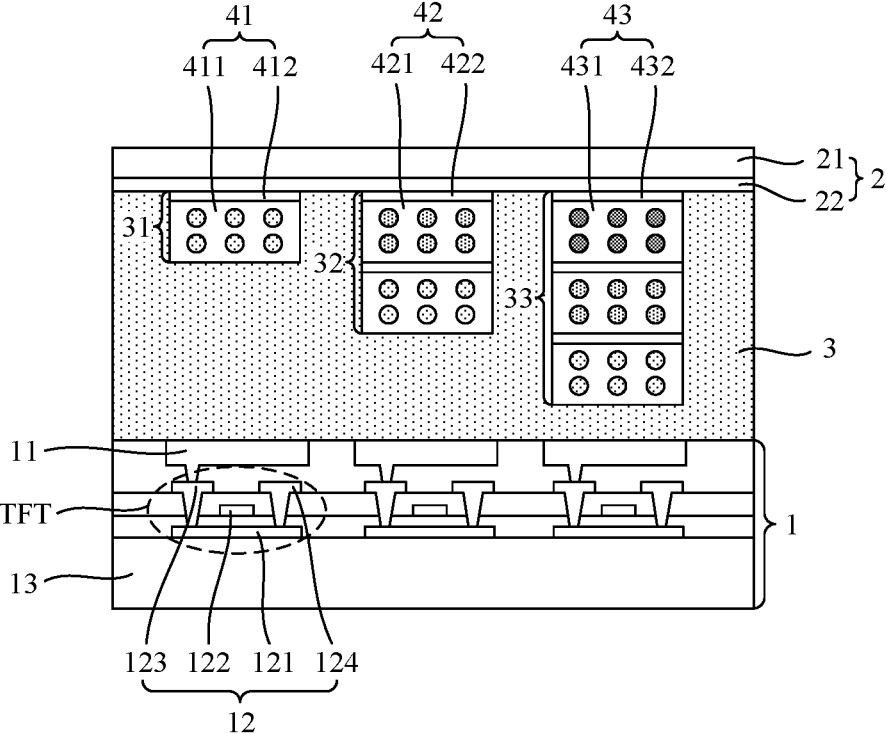
FIG. 18 is a schematic diagram of another cross-sectional structure in a direction BB' in FIG. 4.
Figure 19:
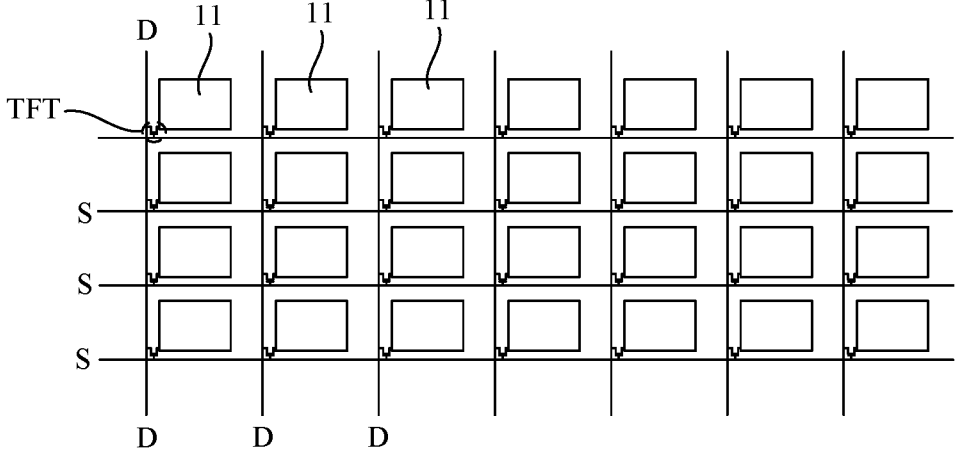
FIG. 19 is a schematic diagram of a specific structure of a first electrode substrate according to an embodiment of this application.

In a possible implementation, as shown in FIG. 18 and FIG. 19, the second electrode substrate 2 is located on a side close to the light emitting surface 300 of the electronic ink base layer 3. The second electrode substrate 2 includes a first glass substrate 21 and a transparent electrode layer 22. The transparent electrode layer 22 may cover all the pixel wells 30, and is connected to a fixed potential, for example, is connected to the ground, to provide a voltage for upper parts of all the pixel wells. The transparent electrode layer 22 may be of an indium tin oxide (Indium tin oxide, ITO) material. In addition, the first glass substrate 21 may be replaced with a substrate of a polyethylene terephthalate (PET) material. The first electrode substrate 1 is located on a side away from the light emitting surface 300 of the electronic ink base layer 3. The first electrode substrate 1 includes a pixel electrode 11 and a drive circuit 12 that correspond to each pixel well. The pixel electrode 11 and the drive circuit 12 are manufactured on a second glass substrate 13. A plurality of pixel electrodes 11 are independent of each other, to provide different pixel voltages corresponding to each pixel well. The drive circuit 12 includes a thin film transistor (Thin Film Transistor, TFT) correspondingly and electrically connected to each pixel electrode 11. The TFT includes a semiconductor layer 121, a gate 122, a source 123, and a drain 124. The first electrode substrate 1 further includes a data line D corresponding to each column of pixel electrodes 11 and a gate line S corresponding to each row of pixel electrodes 11. The source of the TFT corresponding to each pixel electrode 11 is electrically connected to the corresponding data line D, the drain is electrically connected to the corresponding pixel electrode 11, and the gate is electrically connected to the corresponding gate line S. When an effective level is provided on the gate line S, the corresponding TFT may be controlled to be conducted, so that a voltage on the data line D is transmitted to the corresponding pixel electrode 11 through the conducted TFT, to provide a voltage for a lower part of the pixel well. Therefore, an electric field is formed based on voltages of the upper side and the lower side of the pixel well, a particle of electronic ink in the pixel well is controlled to move, to control a color displayed by one pixel well, and an image may be displayed by controlling a plurality of pixel wells. It should be noted that this embodiment of this application provides only an example of the drive circuit. In another implementable implementation, the color portion in the pixel well may be driven by using another type of drive circuit. A specific structure of the drive circuit is not limited in this embodiment of this application.

Figure 20:
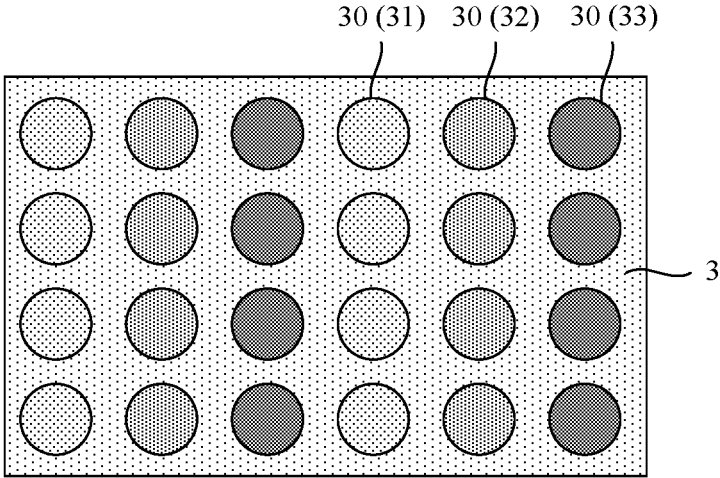
FIG. 20 is a top view of another electronic ink display panel according to an embodiment of this application.

In addition, it should be noted that a shape of an opening of the pixel well 30 is not limited in this embodiment of this application. In the foregoing embodiment, a rectangular opening of the pixel well 30 is merely used as an example for description. In another possible implementation, as shown in FIG. 20, the shape of the opening of the pixel well 30 may be of an arbitrary shape such as a circle or another polygon.

An embodiment of this application further provides an electronic device, including the electronic ink display panel in any one of the foregoing embodiments. A specific structure and principle of the electronic ink display panel are the same as those in the foregoing embodiments, and details are not described herein again. The electronic device may be, for example, any product or component that has a display function, for example, a mobile phone, a tablet computer, an e-reader, a smartwatch, an electronic label, a navigation instrument, a watch, or a band.

For the foregoing manufacturing method for an electronic ink display panel, in a possible implementation, step 101: Form an electronic ink base layer on a first electrode substrate, and manufacture a plurality of pixel wells on a surface of a side that is of the electronic ink base layer and that is away from the first electrode substrate, where a pixel well manufacturing process includes: coating an embossing adhesive on the first electrode substrate, and embossing the plurality of pixel wells on the embossing adhesive by using a nano embossing process. A material of the electronic ink base layer is an embossing adhesive. The embossing adhesive is first coated as an electronic ink base layer of a to-be-formed pixel well. Then, a plurality of pixel wells are formed on a surface of the electronic ink base layer by using the nano embossing process, to form an electronic ink base layer that includes a pixel well. The nano embossing technology has high precision, and may implement manufacturing of a high-resolution pixel well 30. In addition, controlling precision of a well depth of the pixel well 30 is high.

In a possible implementation, step 102: Before a first mixed liquid is filled in each pixel well of the electronic ink base layer, the method further includes: forming a hydrophobic layer on a side wall of each pixel well and/or on a surface of a light emitting surface of the electronic ink base layer.

In a possible implementation, the first ink includes a first color particle and a black filling liquid, the second ink includes a second color particle and a black filling liquid, and the third ink includes a third color particle and a black filling liquid.

In a possible implementation, the first ink includes a first color particle, a black particle, and a transparent filling liquid, the second ink includes a second color particle, a black particle, and a transparent filling liquid, and the third ink includes a third color particle, a black particle, and a transparent filling liquid.

In a possible implementation, the first color particle, the second color particle, and the third color particle include one red particle, one green particle, and one blue particle.

All or some of the foregoing embodiments may be implemented by software, hardware, firmware, or any combination thereof. When the software is used for implementation, the embodiments may be completely or partially implemented in a form of a computer program product. The computer program product includes one or more computer instructions. When the computer program instructions are loaded and executed on a computer, the procedure or functions according to this application are all or partially generated. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (for example, a coaxial cable, an optical fiber, or a digital subscriber line) or a wireless manner (for example, infrared, wireless, or microwave). The computer-readable storage medium may be any available medium accessible by a computer, or include one or more data storage devices such as a server or a data center integrating an available medium. The usable medium may be a magnetic medium (for example, a floppy disk, a hard disk, or magnetic tape), an optical medium (for example, a DVD), a semiconductor medium (for example, a solid state disk Solid State Disk), or the like.

In the embodiments of this application, "at least one" means one or more, and "a plurality of" means two or more. The term "and/or" describes an association relationship of associated objects, and indicates that three relationships may exist. For example, A and/or B may indicate the following three cases: Only A exists, both A and B exist, and only B exists. A and B may be singular or plural. The character "/" usually indicates an "or" relationship between the associated objects. "at least one of the following" or a similar expression thereof is any combination of these items, including a single item or any combination of a plurality of items. For example, at least one of a, b, and c may represent a, b, c, a and b, a and c, b and c, or a, b, and c, where a, b, and c may be singular or plural.

The foregoing descriptions are merely preferred embodiments of this application, and are not intended to limit this application. For a person skilled in the art, various modifications and changes may be made in this application. A person skilled in the art may make various modifications and changes to this application. Any modification, equivalent replacement, or improvement made without departing from the spirit and principle of this application shall fall within the protection scope of this application.

What is claimed is:

1. An electronic ink display panel, comprising:
an electronic ink base layer, wherein a light emitting surface of the electronic ink base layer comprises a plurality of pixel wells, the plurality of pixel wells comprise a plurality of first pixel wells and a plurality of second pixel wells, and a depth of each first pixel well is less than a depth of each second pixel well;
a first color portion is disposed in each pixel well in the plurality of first pixel wells and the plurality of second pixel wells, each first color portion comprises first ink and a first packaging layer, each first packaging layer is located on a side that is of the corresponding first ink and that is away from a bottom of the corresponding pixel well, and in each first pixel well, the corresponding first color portion fills the first pixel well;
a second color portion is further disposed in each pixel well in the plurality of second pixel wells, each second color portion is located on a side that is of the corresponding first color portion and that is away from the bottom of the corresponding pixel well, each second color portion comprises second ink and a second packaging layer, and each second packaging layer is located on a side that is of the corresponding second ink and that is away from the bottom of the corresponding pixel well; and
wherein the first ink and the second ink of the plurality of pixel wells comprise particles of different colors; and
wherein:
the plurality of pixel wells further comprise a plurality of third pixel wells, and the depth of each second pixel well is less than a depth of each third pixel well;
the first color portion and the second color portion in each second pixel well fill the respective second pixel well;
a first color portion, a second color portion, and a third color portion are disposed in each third pixel well;
in each third pixel well, the corresponding second color portion is located on a side that is of the corresponding first color portion and that is away from the bottom of the third pixel well, and the corresponding third color portion is located on a side that is of the corresponding second color portion and that is away from the bottom of the corresponding third pixel well;
each third color portion comprises third ink and a third packaging layer, and each third packaging layer is located on a side that is of the corresponding third ink and that is away from the bottom of the corresponding third pixel well; and
any two of the first ink, the second ink, and the third ink comprise particles of different colors.

2. The electronic ink display panel according to claim 1, wherein:
the first ink comprises a first color particle and a black filling liquid, the second ink comprises a second color particle and a black filling liquid, and the third ink comprises a third color particle and a black filling liquid.

3. The electronic ink display panel according to claim 2, wherein:
the first color particle, the second color particle, and the third color particle comprise one red particle, one green particle, and one blue particle.

4. The electronic ink display panel according to claim 1, wherein:
the first ink comprises a first color particle, a black particle, and a transparent filling liquid, the second ink comprises a second color particle, a black particle, and a transparent filling liquid, and the third ink comprises a third color particle, a black particle, and a transparent filling liquid.

5. The electronic ink display panel according to claim 1, wherein:
a hydrophobic layer is disposed on a side wall of each pixel well and/or on a surface of the light emitting surface of the electronic ink base layer.

6. The electronic ink display panel according to claim 1, wherein:
the electronic ink base layer is an embossing adhesive.

7. The electronic ink display panel according to claim 6, wherein:
a material of the embossing adhesive is a resin material.

8. The electronic ink display panel according to claim 1, further comprising:
a first electrode substrate and a second electrode substrate, wherein the electronic ink base layer is located between the first electrode substrate and the second electrode substrate, wherein
the second electrode substrate is located on a side of the electronic ink base layer that comprises the light emitting surface, and the second electrode substrate comprises a transparent electrode layer; and
the first electrode substrate is located on a side of the electronic ink base layer that faces away from the light emitting surface, and the first electrode substrate comprises a pixel electrode and a drive circuit that correspond to each pixel well.

9. A manufacturing method for an electronic ink display panel, comprising:
forming an electronic ink base layer, and manufacturing a plurality of pixel wells on a surface of a side of the electronic ink base layer, wherein the plurality of pixel wells comprise a plurality of first pixel wells and a plurality of second pixel wells, and a depth of each first pixel well is less than a depth of each second pixel well;
filling each pixel well of the electronic ink base layer with a first mixed liquid, wherein the first mixed liquid comprises a first packaging liquid and first ink, the first mixed liquid fills each first pixel well, and the first mixed liquid is filled in a part of each second pixel well;
after the first packaging liquid floats on a surface of a side that is of the first ink and that is away from a bottom of each pixel well, solidifying the first packaging liquid to form a first packaging layer, wherein the first packaging layer and the first ink form a first color portion;

filling each second pixel well other than the first color portion with a second mixed liquid, wherein the second mixed liquid comprises a second packaging liquid and second ink, and the first color portion and the second mixed liquid in each second pixel well fill the respective second pixel well; and after the second packaging liquid floats on a surface of a side that is of the second ink and that is away from the bottom of each pixel well, solidifying the second packaging liquid to form a second packaging layer, wherein the second packaging layer and the second ink form a second color portion, wherein the first ink and the second ink comprise particles of different colors; and wherein:

the plurality of pixel wells further comprise a plurality of third pixel wells, and the depth of each second pixel well is less than a depth of each third pixel well; and the manufacturing method for an electronic ink display panel further comprises:

filling a part of each third pixel well with a first color portion and a second color portion;

filling a part of each third pixel well other than the first color portion and the second color portion with a third mixed liquid, wherein the third mixed liquid comprises a third packaging liquid and third ink; and after the third packaging liquid floats on a surface of a side that is of the third ink and that is away from a bottom of the third pixel well, solidifying the third packaging liquid to form a third packaging layer, wherein the third packaging layer and the third ink form a third color portion; and any two of the first ink, the second ink, and the third ink comprise particles of different colors.

10. The manufacturing method for an electronic ink display panel according to claim 9, wherein forming the electronic ink base layer, and manufacturing the plurality of pixel wells on the surface of the side of the electronic ink base layer comprises:

coating an embossing adhesive, and embossing the plurality of pixel wells on the embossing adhesive by using a nano embossing process.

11. The manufacturing method for an electronic ink display panel according to claim 9, wherein before the filling each pixel well of the electronic ink base layer with a first mixed liquid, the method further comprises:

forming a hydrophobic layer on a side wall of each pixel well and/or on a surface of a light emitting surface of the electronic ink base layer.

12. The manufacturing method for an electronic ink display panel according to claim 9, wherein the first ink comprises a first color particle and a black filling liquid, the second ink comprises a second color particle and a black filling liquid, and the third ink comprises a third color particle and a black filling liquid.

13. The manufacturing method for an electronic ink display panel according to claim 12, wherein the first color particle, the second color particle, and the third color particle comprise one red particle, one green particle, and one blue particle.

14. The manufacturing method for an electronic ink display panel according to claim 9, wherein the first ink comprises a first color particle, a black particle, and a transparent filling liquid, the second ink comprises a second color particle, a black particle, and a transparent filling liquid, and the third ink comprises a third color particle, a black particle, and a transparent filling liquid.

15. An electronic device, comprising:

an electronic ink base layer, wherein a light emitting surface of the electronic ink base layer comprises a plurality of pixel wells, the plurality of pixel wells comprise a plurality of first pixel wells and a plurality of second pixel wells, and a depth of each first pixel well is less than a depth of each second pixel well;

a first color portion is disposed in each pixel well in the plurality of first pixel wells and the plurality of second pixel wells, each first color portion comprises first ink and a first packaging layer, each first packaging layer is located on a side that is of the corresponding first ink and that is away from a bottom of the corresponding pixel well, and in each first pixel well, the corresponding first color portion fills the first pixel well;

a second color portion is further disposed in each pixel well in the plurality of second pixel wells, each second color portion is located on a side that is of the corresponding first color portion and that is away from the bottom of the corresponding pixel well, each second color portion comprises second ink and a second packaging layer, and each second packaging layer is located on a side that is of the corresponding second ink and that is away from the bottom of the corresponding pixel well; and wherein the first ink and the second ink of the plurality of pixel wells comprise particles of different colors; and wherein:

the plurality of pixel wells further comprise a plurality of third pixel wells, and the depth of each second pixel well is less than a depth of each third pixel well;

the first color portion and the second color portion in each second pixel well fill the second pixel well;

a first color portion, a second color portion, and a third color portion are disposed in each third pixel well;

in each third pixel well, the second color portion is located on a side that is of the corresponding first color portion and that is away from the bottom of the pixel well, and the third color portion is located on a side that is of the corresponding second color portion and that is away from the bottom of the third pixel well;

each third color portion comprises third ink and a third packaging layer, and each third packaging layer is located on a side that is of the third ink and that is away from the bottom of the respective third pixel well; and any two of the first ink, the second ink, and the third ink comprise particles of different colors.

16. The electronic device according to claim 15, wherein the first ink comprises a first color particle and a black filling liquid, the second ink comprises a second color particle and a black filling liquid, and the third ink comprises a third color particle and a black filling liquid.

17. The electronic device according to claim 15, wherein the first ink comprises a first color particle, a black particle, and a transparent filling liquid, the second ink comprises a second color particle, a black particle, and a transparent filling liquid, and the third ink comprises a third color particle, a black particle, and a transparent filling liquid.

18. The electronic device according to claim 17, wherein the first color particle, the second color particle, and the third color particle comprise a red particle, a green particle, and a blue particle.

19. The electronic device according to claim 15, wherein a hydrophobic layer is disposed on a side wall of each pixel well and/or on a surface of the light emitting surface of the electronic ink base layer.

20. The electronic device according to claim 15, wherein the electronic ink base layer is an embossing adhesive.

\* \* \* \* \*